United States Patent [19]

Nolte

[11] Patent Number: 4,865,182

[45] Date of Patent: Sep. 12, 1989

[54] ENTRAINING CLEAT FOR A CONVEYOR BELT ASSEMBLY

[75] Inventor: Gunther Nolte, Moers, Fed. Rep. of Germany

[73] Assignee: Conrad Scholtz AG, Hamburg, Fed. Rep. of Germany

[21] Appl. No.: 253,085

[22] Filed: Oct. 4, 1988

[30] Foreign Application Priority Data

Oct. 12, 1987 [DE] Fed. Rep. of Germany ....... 3734490

[51] Int. Cl.$^4$ .............................................. B65G 15/44
[52] U.S. Cl. .................................. 198/699; 198/698
[58] Field of Search ...................... 198/688.1, 698, 699, 198/730, 731, 711; 403/224, 337, 381

[56] References Cited

U.S. PATENT DOCUMENTS

| 2,461,150 | 2/1949 | Flynn et al. | 198/698 X |
|---|---|---|---|
| 2,875,887 | 3/1959 | Hinchcliffe | 198/699 |
| 3,100,566 | 8/1963 | Hinchcliffe | 198/699 |
| 3,147,850 | 9/1964 | Ronceray | 198/698 X |
| 4,273,238 | 6/1981 | Blattermann et al. | |
| 4,279,530 | 7/1981 | Mullenberg | 403/337 |
| 4,295,748 | 10/1981 | Ohara | 403/337 X |
| 4,425,995 | 1/1984 | Blattermann et al. | |
| 4,440,537 | 4/1984 | Blattermann et al. | |
| 4,676,367 | 6/1987 | Nolte . | |
| 4,681,503 | 7/1987 | Nolte . | |
| 4,697,693 | 10/1987 | Rajala et al. | 198/698 X |

Primary Examiner—Robert J. Spar
Assistant Examiner—D. Glenn Dayoan
Attorney, Agent, or Firm—Bell, Seltzer, Park & Gibson

[57] ABSTRACT

An entraining cleat of rubber or like material for attachment to a flat conveyor belt of an assembly for steep or vertical conveying of loose material is provided. The entraining cleat includes an entraining bar having a lower straight branch and lattteral projections extending perpendicularly outwardly from opposite sides thereof above the lower end of the branch. A foot portion includes two profile portions having angular cross-sections extending generally parallel to each other with respective lower branches extending outwardly in opposite directions with flat bottom surfaces for being positioned on the conveyor belt and upper branches having a grooved-shaped space therebetween and upper flat faces for receiving the lower end of the lower branch of the entraining bar within the groove-shaped space and the latteral projections on the upper flat faces for mounting the entraining bar on the foot portion. Screw bolts are formed within the profile portions of the foot portion by vulcanization or the like and extend upwardly out of the profile portions of the foot portion and through apertures in the respective lateral projections of the entraining bar for releasably fastening the entraining bar to the foot portion.

3 Claims, 1 Drawing Sheet

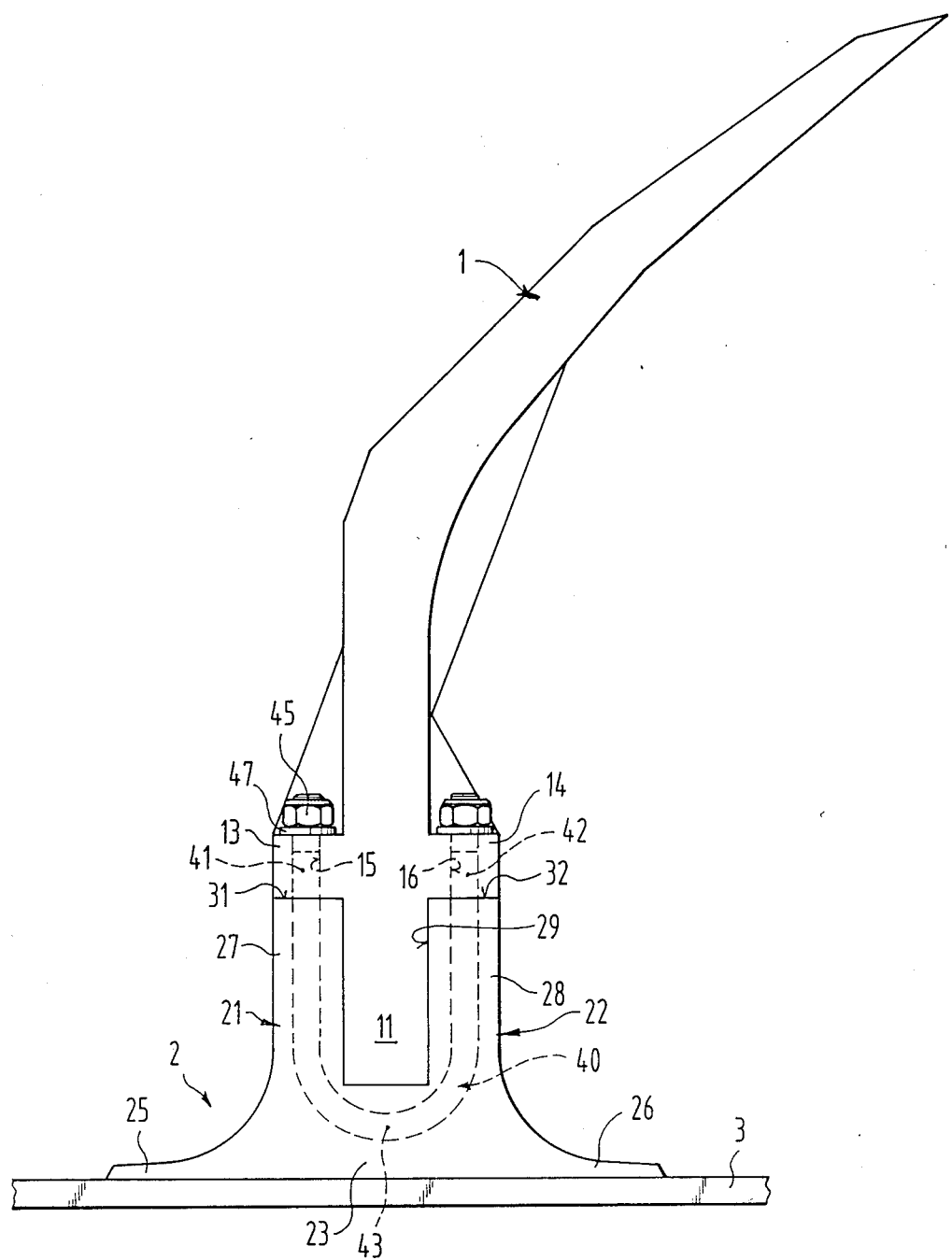

ENTRAINING CLEAT FOR A CONVEYOR BELT ASSEMBLY

FIELD OF THE INVENTION

This invention relates to an improved entraining cleat construction of rubber or like material for attachment to a flat conveyor belt of an assembly for steep or vertical conveying of loose material.

BACKGROUND OF THE INVENTION

Entraining cleats of rubber or like material have heretofore been utilized in assemblies for steep or vertical conveying of loose material by attachment to a flat conveyor belt of such assembly, as fully described and illustrated in assignee's copending U.S. patent application Ser. No. 274,713, filed Nov. 21, 1988 which is a continuation of Ser. No. 509,432, filed June 6, 1983, and issued U.S. Pat. Nos. 4,273,238; 4,425,995; 4,440,537; 4,676,367 and 4,681,503.

In the entraining cleat constructions of applicant's prior application and patents and in other entraining cleat constructions known to applicant, an entraining bar of desired configuration was positioned between separate parts of a generally two-piece foot portion and secured thereby therebetween by screw bolts which extended transversely through the entraining bar and the upwardly extending branches of each part of the foot portion. To accommodate these transversely extending screw bolts, corresponding apertures were required to be formed along the length of the entraining bar.

Since, in recent years, the entraining cleat constructions have become bigger and bigger and higher and higher, changes were required for strength and stabilization of such entraining cleats including vulcanizing several layers of steel strands into the entraining bar. These changes made it very difficult, if not impossible, to provide transverse apertures for the screw bolts through the entraining bar during manufacture of such entraining bars. Accordingly, subsequent drilling or punching of the apertures through the entraining bar was required and was extremely uneconomical. Additionally, such entraining bars were considerably weakened by the transverse apertures formed through the main body of the entraining bar for reception of the screw bolts.

It has not been considered possible to eliminate the use of such screw bolts for fastening of entraining bars to a foot portion, since this arrangement enabled the entraining bar to be releasably fastened to the foot portion for replacement or exchange after being subjected to the considerable wear normally exerted on such entraining bars during use in the assembly for steep or vertical conveying of loose material.

OBJECTS AND SUMMARY OF THE INVENTION

Accordingly, it is an object of this invention to provide an improved entraining cleat construction which will overcome the above discussed problems and provide an improved entraining cleat which eliminates the necessity of screw bolt apertures being formed transversely through the main body of the entraining bar, while retaining the releasable fastening of the entraining bar to the foot portion for replacement of the entraining bar after wear.

By this invention, it has been found that the above object may be accomplished by providing an entraining cleat of rubber or like material for attachment to a flat conveyor belt of an assembly for steep or vertical conveying of loose material, wherein the entraining cleat comprises generally the following.

An entraining bar of desired configuration is provided which includes a lower straight branch having lateral projections extending generally perpendicularly from opposite sides thereof above the lower end of the lower branch and having apertures extending generally perpendicularly through each of the projections.

A foot portion is provided and is adapted to be secured to the flat conveyor belt for releasable fastening of the entraining bar to the conveyor belt. The foot portion comprises two profile portions having angular cross-sections and extending generally parallel to each other in mirror-image relationship. The profile portions have respective lower branches extending outwardly in opposite directions from the foot portion and define flat bottom surfaces adapted for being positioned on and being secured to the flat conveyor belt, and respective upper branches extending upwardly from the lower branches and defining therebetween a groove-shaped space and upper flat faces for receiving the lower end of the lower branch of the entraining bar within the groove-shaped space and the lateral projections on the upper flat faces for mounting the entraining bar on the foot portion.

Screw bolts are formed within the upper branches of the profile portions of the foot portion by vulcanization or like process and extend upwardly out of the upper flat faces of the profile portions of the foot portion and through the apertures in the respective lateral projections of the entraining bar for releasably fastening the entraining bar to the foot portion.

Preferably, the foot portion includes a connecting portion extending between and being integrally formed with and connecting the lower branches of the profile portions to define the bottom of the groove-shaped space between the upper branches and to form a unitary one-piece foot portion. The screw bolts are preferably of a U-shaped construction extending through the connecting portion and each of the profile portions.

By this construction of an entraining cleat, the screw bolts are not aligned transversely, but substantially parallel to the plane of the entraining bar and are vulcanized into the upper branches of the profile portions of the foot portion. The screw bolts extend through lateral projections extending generally perpendicularly outwardly from opposite sides of the entraining bar. This arrangement provides a very secure and strong, yet releasable, connection between the entraining bar and the foot portion, which does not require apertures passing through the main body portion of the entraining bar. Mounting and demounting of the entraining bar on the foot portion is particularly simple with this arrangement.

This arrangement further provides a seal which is continuous over the entire length of the entraining bar between the foot portion and the entraining bar which prevents the penetration by material being conveyed, such as corrosive salts or the like, into any interstices between the entraining bar and the foot. The preferred provision of a one-piece foot portion and the assembly of the entraining bar thereon by the lower end of the entraining bar being positioned within a groove-shaped space in the foot portion and the lateral projections of the entraining bar resting on the upper faces of the foot portion provide a particularly stable construction and one which does not require alignment of two parts of a foot portion. With the preferred U-shaped screw bolts being imbedded within the foot portion, the screw bolts effectively encircle the groove-shaped space which receives the entraining bar and further gives a particularly stable construction which can receive and hold extremely high or long entraining bars without deflecting the conveyor belt.

BRIEF DESCRIPTION OF THE DRAWINGS

Some of the objects and advantages of this invention have been set forth above, other objects and advantages of the invention will become apparent from the following detailed description of a preferred embodiment of the invention, when taken in conjunction with the accompanying drawing, in which.

The single figure of the drawing is a side elevational view of a preferred embodiment of the entraining cleat in accordance with the present invention and shown mounted on a section of a conveyor belt.

DETAILED DESCRIPTION OF PREFERRED EMBODIMENT OF THE INVENTION

Referring now to the drawings, there is shown in the single figure thereof an entraining cleat of rubber or like material comprising generally an entraining bar 1 and a foot portion 2 for releasably receiving and mounting the entraining bar 1 and for being attached to a conveyor belt 3 of an assembly (not shown) for steep or vertical conveying of loose material.

The entraining bar 1 is of desired configuration and includes an upper angled or elbowed branch and a lower straight branch 11. The lower straight branch 11 includes lateral projections 13, 14 extending generally perpendicularly outwardly from opposite sides thereof above the lower end of the lower branch 11. These lateral projects 13, 14 have apertures 15, 16 extending generally perpendicularly therethrough and generally parallel with the lower branch 11 of the entraining bar 1.

The foot portion 2 is adapted to be permanently secured to the conveyor belt 3 by cold gluing or the like and receives the entraining bar 1 for releasably fastening the entraining bar 1 thereto and thus to the conveyor belt 3. The foot portion 2 comprises two profile portions 21, 22 which are mirror images of each other and have generally angular cross-sections and extend generally parallel to each other in mirror-image relationship. The profile portions 21, 22 include respective lower branches 25, 26 which extend outwardly in opposite directions from the foot portion 2 and define flat bottom surfaces for being positioned on and secured to the flat conveyor belt 3. The profile portions 21, 22 further include respective integral upper branches 27, 28 extending upwardly from the lower branches 25, 26 and which define a groove-shaped space 29 therebetween and upper flat end faces 31, 32 thereon. The lower end of the lower branch 11 of the entraining bar 1 is received within the groove-shaped space 29 and the bottom faces of the latteral projections 13, 14 are positioned on and rest on the upper flat end faces 31, 32 of the profile portions 21, 22 of the foot portion 2 for mounting of the entraining bar 1 on the foot portion 2.

Screw bolts 40 are formed within the upper branches 27, 28 of the profile portions 21, 22 of the foot portion 2 by vulcanization or like process and extend upwardly out of the upper flat end faces 31, 32 of the profile portions 21, 22 of the foot portion 2 and through the apertures 15, 16 in the respective latteral projections 13, 14 of the entraining bar 1. Nuts 45 and washers 47 are positioned on the ends of the screw bolts 40 and screwed thereon for releasably fastening the entraining bar 1 to the foot portion 2.

Preferably, the foot portion 2 includes a connecting portion 43 which extends between and is integrally formed with and connects the lower brances 25, 26 of the profile portions 21, 22 to define the bottom of the groove-shaped space 29 between the upper branches 27, 28 and which forms a unitary one-piece foot portion 2. The screw bolts 40 are preferably of a U-shaped construction including upper limbs 41, 42 which extend outwardly of the profile portions 21, 22 and pass through the apertures 15, 16 in the lateral projections 13, 14 of the entraining bar 1. By this U-shaped construction of the bolts 40, the bolt passes through the profile portions 21, 22 and the connecting portion 23 of the foot portion 2 to surround the groove-shaped space 29 and thus the lower branch 11 of the entraining bar 1 to enhance the strength and stability of the entraining cleat construction.

Inasmuch as the entraining cleat normally extends the entire width of the conveyor belt 3, a plurality of screw bolts 40 are provided in the foot portion 2 and a plurality of aligned apertures 15, 16 are provided in the lateral projections 13, 14 of the entraining bar 1. Removal and replacement of the entraining bar 1 after wear from the foot portion 2 of the entraining cleat is relatively simple by unscrewing the nuts 45, removing the washers 47, drawing the entraining bar 1 upwardly out of the foot portion 2, introducing a new entraining bar 1 into the groove-shaped space 29, replacing the washers 47 and nuts 45 and tightening the nuts 45.

Thus, the improved entraining cleat of this invention has provided a construction of superior strength and stability and has eliminated the necessity of positioning screw bolts transversely through transverse apertures formed in the lower branch of the entraining cleat which reduces the strength of such entraining cleat. This construction of an entraining cleat further provides ease in mounting and replacing the entraining bar on the foot portion of the entraining cleat.

In the drawings and specification there has been set forth a preferred embodiment of this invention, and although specific terms are employed, they are used in a generic and descriptive sense only and not for purposes of limitation, the scope of the invention is defined in the following claims.

What is claimed is:

1. An entraining cleat of rubber or like material for attachment to a flat conveyor belt of an assembly for steep or vertical conveying of loose material, said entraining cleat comprising:

an entraining bar of desired configuration and having a lower straight branch including lateral projections extending generally perpendicularly outwardly from opposite sides thereof above the lower end of said lower branch and having apertures extending generally perpendicularly through each of said projections;

a foot portion adapted to be secured to the flat conveyor belt for releasable fastening of said entraining bar to the conveyor belt and comprising two profile portions having angular cross-sections and extending generally parallel to each other, said profile portions having respective lower branches extending outwardly in opposite directions from said foot portion and defining flat bottom surfaces adapted for being positioned on and secured to the flat conveyor belt and respective upper branches extending upwardly from said lower branches and defining a groove-shaped space therebetween and upper flat faces thereon for receiving the lower end of said lower branch of said entraining bar within said groove-shaped space and said lateral projections on said upper flat faces for mounting said entraining bar on said foot portion; and screw bolt means formed within said upper branches of said profile portions of said foot portion by vulcanization or like process and extending upwardly out of said upper flat faces of said profile portions of said foot portion and through said apertures in said respective lateral projections of said entraining bar for releasably fastening said entraining bar to said foot portion.

2. An entraining cleat, as set forth in claim 1, wherein said foot portion includes a connecting portion extending between and being integrally formed with and connecting said lower branches of said profile portions to define the bottom of said groove-shaped space between said upper branches and to form a unitary one-piece foot portion.

3. An entraining cleat, as set forth in claim 2, wherein said screw bolt means comprises a U-shaped construction extending through said connecting portion and each of said profile portions of said foot portion.

* * * * *